United States Patent
Kamatani

[19]
[11] Patent Number: 5,909,422
[45] Date of Patent: Jun. 1, 1999

[54] OPTICAL DISK READING METHOD FOR MULTI-LAYERED OPTICAL DISK SYSTEM

[75] Inventor: Yasuo Kamatani, Sagamihara, Japan

[73] Assignee: Laser Dynamics, Inc., Kanagawa, Japan

[21] Appl. No.: 08/988,222

[22] Filed: Dec. 10, 1997

Related U.S. Application Data

[63] Continuation of application No. 08/586,185, Jan. 16, 1996, Pat. No. 5,798,994.

[51] Int. Cl.[6] ................................................. G11B 7/00
[52] U.S. Cl. ............................... 369/94; 369/93; 369/112
[58] Field of Search ................................. 369/94, 93, 47, 369/48, 49, 50, 54, 58, 59, 112, 109, 103, 110, 283, 275.4, 275.5

[56] References Cited

U.S. PATENT DOCUMENTS

| | | | |
|---|---|---|---|
| 5,062,098 | 10/1991 | Hori et al. | 369/112 |
| 5,202,875 | 4/1993 | Rosen et al. | 369/112 X |
| 5,594,713 | 1/1997 | Komma et al. | 369/112 |
| 5,748,603 | 5/1998 | Kim et al. | 369/112 |

*Primary Examiner*—Muhammad N. Edun
*Attorney, Agent, or Firm*—Rabin & Champagne, P.C.

[57] ABSTRACT

A multi-layered optical disk reading method which makes possible to reproduce encoded data from each data layer by focusing laser beam precisely onto a data layer of the multi-layered optical disk. After a multi-layered optical disk is loaded, a central processing unit (CPU) receives an operator's signal to access certain data layer. Then the CPU refers to stored data in the CPU's memory for a diffraction angle to focus laser beam onto a certain data layer. The CPU retrieves an operational coded signal, and transmits the signal to a liquid crystal diffraction device to modulate the liquid crystal diffraction device to deflect and focus the laser beam onto the certain data layer. After the liquid crystal diffraction device is modulated by the operational signal from the CPU, the CPU also operates a routing circuit to transmit read-out signal from a detector which receives reflected laser beam from the certain data layer, to a selected decoding circuit in a data processor.

7 Claims, 5 Drawing Sheets

OPTICAL DISK READING METHOD FOR MULTI-LAYERED OPTICAL DISK SYSTEM

CROSS-REFERENCE TO RELATED APPLICATION

This application is a continuation of applicant's application Ser. No. 08/586,185, filed Jan. 16, 1996, now U.S. Pat. No. 5,798,994 issued Aug. 25, 1998.

BACKGROUND OF THE INVENTION

1. FIELD OF THE INVENTION

This invention relates to an optical data reproducing method. More specifically, this invention relates to an optical disk reading method which is able to reproduce encoded data from each data layer of a multi-layered optical disk.

2. DESCRIPTION OF THE PRIOR ART

Initialized by the vast increase in information that needs to be processed, optical data storage systems have become very important systems particularly because of their high storage density per unit area. Most of the recent optical information storage systems, which rotate a single optical disk are used on which the information is digitally stored in concentric circular tracks in an ordered, predefined manner to allow chronological fast reading and fast random access to desired pits of data.

In order to accomplish even more storage capacity of optical disk systems for enormous information processing, such as video or picture communication like the so called video-on-demand service, multiple disk systems have been proposed. An optical disk system having two or more data layers may in theory be accessed at different disks by changing the focal point with a moving lens. Examples of this type of state-of-the-art are described in U.S. Pat. No. 5,202,875 issued Apr. 13, 1993 to Rosen, et al.; and Japanese Published Application, 63-276732 published Nov. 15, 1988 by Watanabe, et al.

Such a multiple disk reading system is applied to varied optical disk information storage systems. For example, a digital video disk (DVD) system for home entertaining is one typical application. The mentioned advantage of vast storage capacity may contribute especially to video signal transmission. In order to reproduce encoded data from each data layer, a laser beam emitted from a laser source has to be focused precisely onto each data layer. To focus the laser beam onto each data layer, the methods such as to change a focusing lens or to move the focusing lens by an actuator are applied to the conventional system. However, such method is not appropriate to apply to the multi-layered optical disk systems which has more than two data layers. Because the number of the changeable focusing lens or the focal point interval modulated by the actuator is limited, a multi-layered optical disk reading method is needed to overcome the mentioned disadvantage of the conventional method.

3. SUMMARY OF THE INVENTION

The present invention has for its object to provide a multi-layered optical disk reading system which is able to reproduce encoded data from each data layer by focusing laser beam precisely onto the data layer and detecting a reflected laser beam from each data layer selectively without employing any mechanical moving component.

The object of the present invention can be achieved by an optical disk reading method, the method comprising the steps of: to load a multi-layered optical disk which has M data layers (wherein M is an integer greater than 1), to receive an operator's signal a to access an Nth data layer of the multi-layered optical disk (wherein N is an integer greater than 1 and not greater than M), to refer to stored, data in a central processing unit (CPU) for a diffraction angle to focus (hereinafter "operation signal") laser beam onto Nth data layer, to modulate a liquid crystal diffraction device to focus the laser beam onto the Nth data layer, and to operate a routing circuit to transmit a readout signal from selected detector to a decoding circuit.

After a multi-layered optical disk is loaded, the total number of the data layers of the multi-layered disk is identified by reading a total of contents (TOC) data or by any discrimination means. Then the operation signal to access a certain data layer is transmitted to the CPU, and the CPU retrieves stored data on a modulation signal to let the liquid crystal diffraction device to focus the laser beam onto the certain data layer. For example, two operational modulation signals to modulate the liquid crystal diffraction device to focus the laser beam onto each of two data layers, must be stored in the memory of the CPU for a double-layered optical disk reading system. The CPU sends the modulation signal to the liquid crystal diffraction device. According to the modulation signal, the liquid crystal diffraction device modulates each of its liquid crystal segments to change numerical aperture between any two of the liquid crystal segments. By changing the numerical aperture between the liquid crystal segments, the transmitted laser beam is focused onto a preferred data layer. The reflected laser beam from the data layer is transmitted to a detector array circuit. Each detector of the array is best placed at a separate position in order to detect selectively the reflected laser beam from selected data layer, and to minimize the effect of an interference. The CPU operates a routing circuit to transmit a readout signal from the selected detector to a selected decoding circuit.

For a fuller understanding of the nature and advantages of the present invention reference should be made to the following detailed description taken in conjunction with the accompanying drawings.

4. BRIEF DESCRIPTION OF THE DRAWINGS

FIG. 2(a) shows a first structure of a pick-up head for a multi-layered optical disk reading apparatus the present invention can be applied to;

FIG. 2(b) shows a second structure of a pick-up head for a multi-layered optical disk reading apparatus the present invention can be applied to;

5. DETAILED DESCRIPTION OF THE PREFERRED EMBODIMENT

Embodiments of the present invention will be explained with reference to the drawings.

Figure 1:
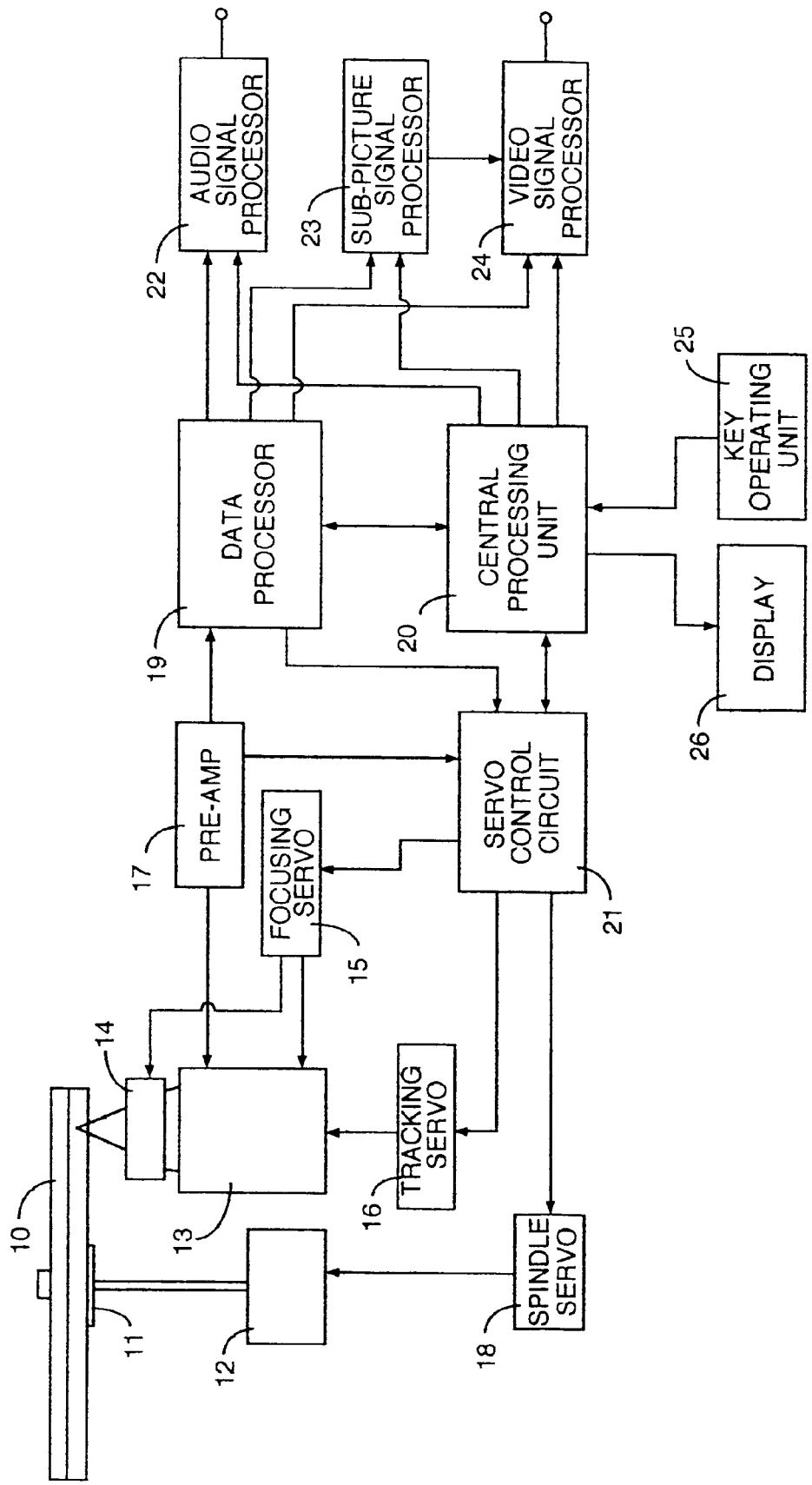
FIG. 1 shows block diagram of an example of a multi-layered optical disk reading apparatus to which the present invention can be applied.

FIG. 1 is a block diagram of an example of a multi-layered optical disk reading apparatus to which the optical disk reading methods of the present invention can be applied. A multi-layered optical disk 10 which has two or more data layers is mounted on and secured by a turntable 11 to be rotated by a spindle motor 12. Encoded pits on the multi-layered optical disk 10 are read by a pickup 13 which includes a laser diode, a focusing lens, a tracking actuator, a photo-detector array, and a focusing lens actuator cooperating with a liquid crystal diffraction device 14. The movement of the pick-up 13 and the modulation of the liquid crystal diffraction device 14 are controlled by a focusing servo circuit 15 and a tracking servo circuit 16. The readout signal from the pickup 13 is transmitted to a pre-amplifier 17. According to a focusing error signal, the focusing servo circuit 15 modulates the focusing lens actuator and the liquid crystal diffraction device 14 to move the focal point of the laser beam emitted from the laser diode to access certain data layer of the multi-layered optical disk 10. And according to a tracking error signal, the tracking servo circuit 16 modulates the tracking actuator to move the pickup 13. The spindle servo circuit 18 modulates the spindle motor 12 in order to track linear velocity of the multi-layered optical disk 10.

The detected readout signal applied to the pre-amplifier 17 from one of the detectors in the detector array of the pickup 13, is transmitted to a data processor 19. The data processor 19 consists of at least one decoding circuit to decode the readout signal. In order to reproduce encoded data from two types of optical disk format, for example a compact disk (CD) and a digital video disk (DVD), the data processor must be composed of two decoding circuits. And the routing from the detector to the decoding circuit in the data processor 19 is operated by a central processing unit 20 (CPU). Part of the readout signal reproduced by the data processor 19 is transmitted to the CPU 20 to observe a data reproduction procedure, and to operate a servo control circuit 21 which modulates the focusing servo circuit 15, the tracking servo circuit 16 and the spindle servo circuit 18. And the decoded readout signal from the data processor 19 is transmitted to an audio processor 22, a sub-picture processor 23 and a video processor 24. The audio processor 22, the sub-picture processor 23 and the video processor 24 are controlled by the CPU 20. The CPU 20 is operated by an operation signal from a key operating unit 25 which transmits all operating signals of an operator. The CPU 20 also controls a display unit 26 to show the data reproducing status to the operator.

Figure 2A:
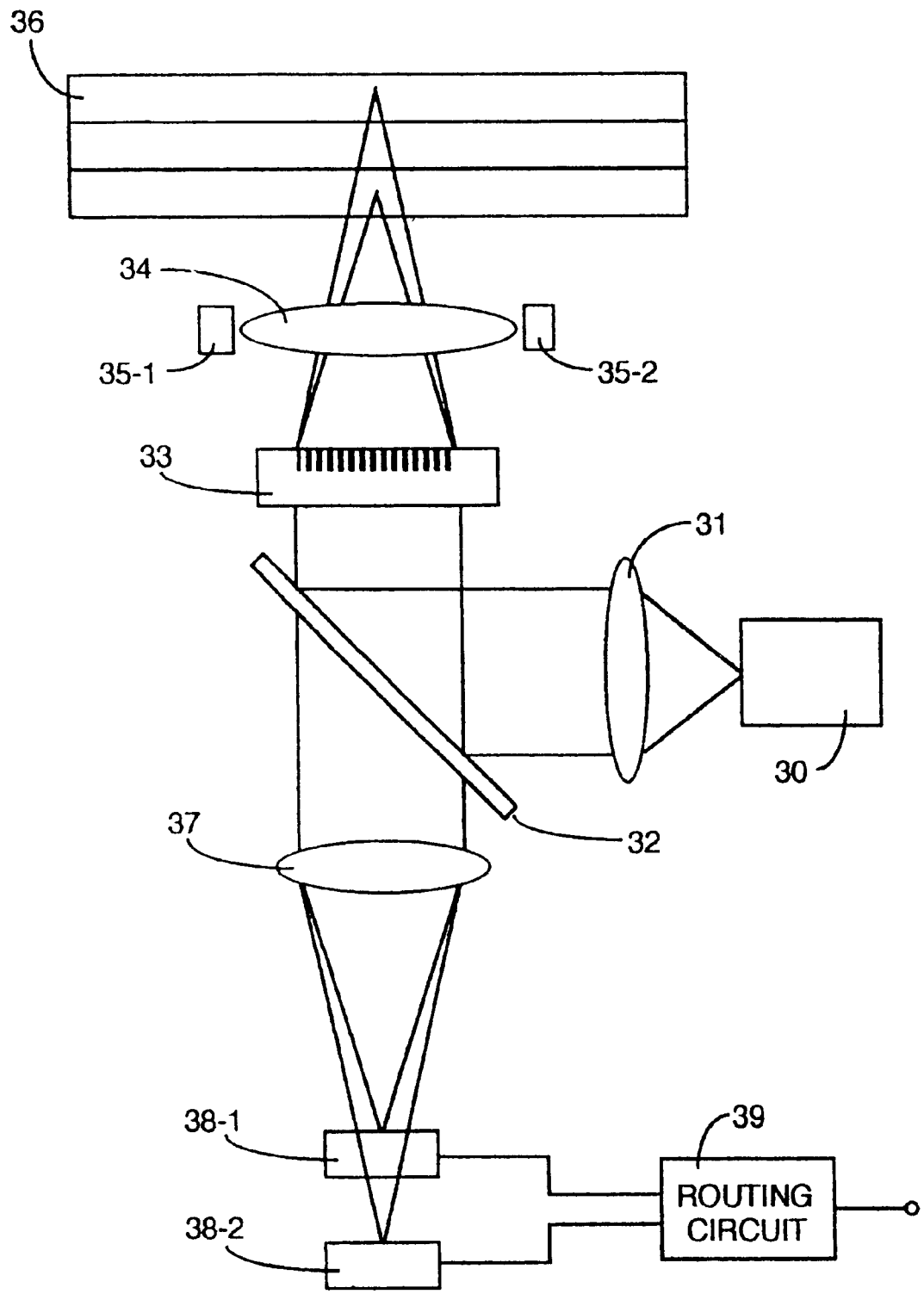

FIG. 2(a) shows a first exemplified structure of a pick-up 13 described in the FIG. 1 to which the present invention can be applied. A laser beam is emitted from a laser diode 30, and the laser beam is collimated by a collimate lens 31. The collimated laser beam is deflected by a half-mirror 32. Then, the deflected laser beam is focused by a liquid crystal diffraction device 33. By modulating each liquid crystal segment of the liquid crystal diffraction device 33, the produced focal point can be moved to focus the laser beam onto a preferred data layer. Also the position of the focal point is precisely moved by a focusing lens 34 which is driven by a dual actuator 35-1~2. When the laser beam is reflected from the data layer of a multi-layered optical disk 36 it is transmitted to a lens 37 and focused on a detector 38-1~2. The detector 38-1 is positioned to detect the laser beam from reflect lower data layer, and the detector 38-2 is to detect laser beam from reflected upper data layer, selectively. The readout signal from the detector 38-1~2 is transmitted to a routing circuit 39 to be selectively sent to a decoding circuit of a data processor.

Figure 2B:
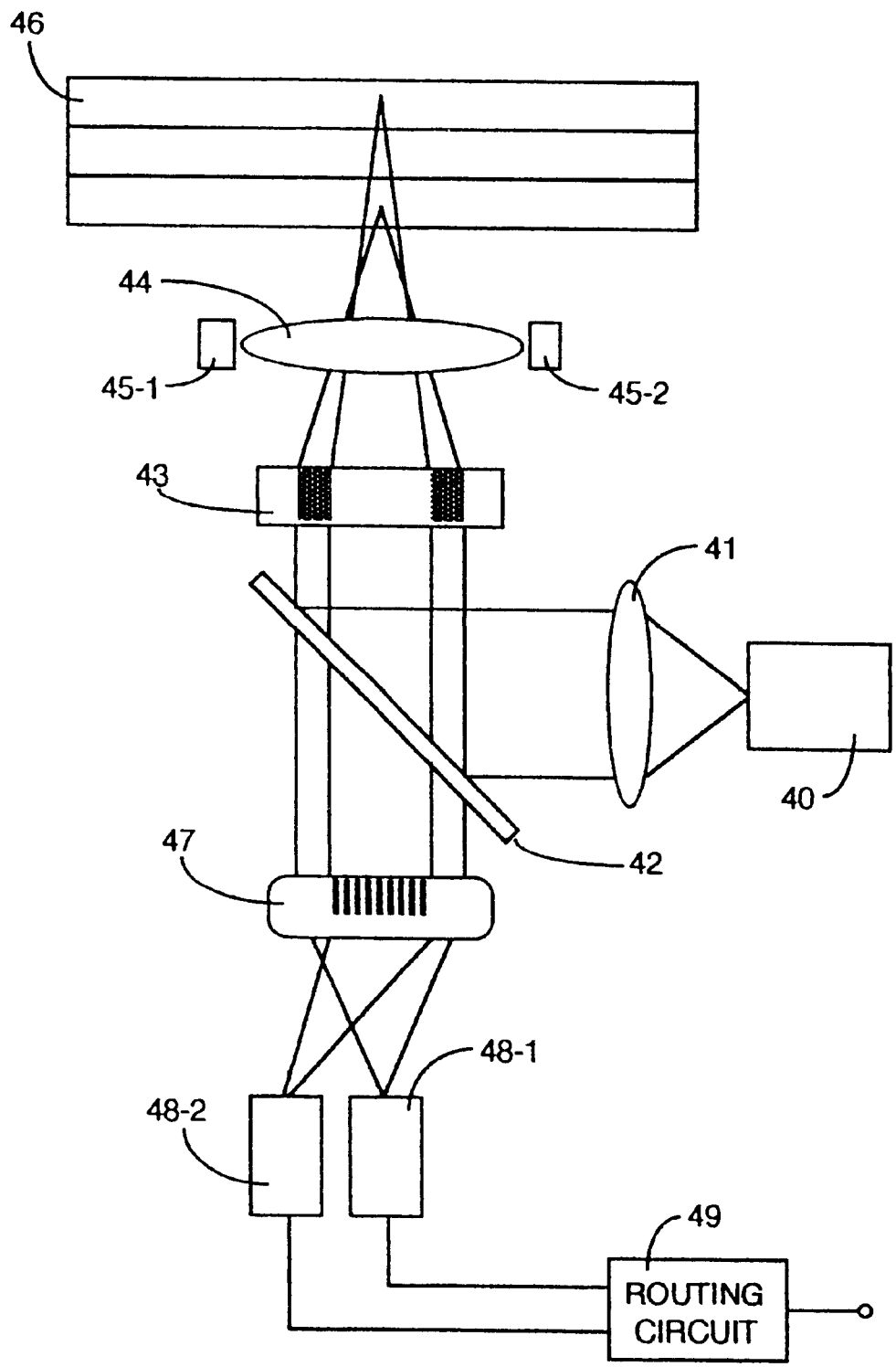

FIG. 2(b) shows a second exemplified structure of a pick-up 13 described in the FIG. 1 to which the present invention can be applied. A laser beam is emitted from a laser diode 40, and the laser beam is collimated by a collimate lens 41. The collimated laser beam is deflected by a half-mirror 42. Then, the deflected laser beam is focused by a liquid crystal diffraction device 43. By turning on or off each liquid crystal segment of the liquid crystal diffraction device 43, the distance between the liquid crystal diffraction device 43 and the focal point can be modulated to focus the laser beam onto a preferred data layer. In this example described in FIG. 2(b), the liquid crystal segment shuts outer spectrum of the laser beam to extend the distance to focal point. By modulating the numerical aperture of the liquid crystal diffraction device 43, the focal point can be moved. Also the position of the focal point is precisely moved by focusing lens 44 which is driven by a dual actuator 45-1~2. When the laser beam is reflected from the certain data layer of a multi-layered optical disk 46 it is transmitted to a grating 47 and transmitted to a detector 48-1~2. The grooves of the grating 47 are fabricated to deflect the inner spectrum of the reflected laser beam from the upper data layer of the multi-layered optical disk 46. The detector 48-1 is positioned to detect the laser beam reflected from lower data layer, and the detector 48-2 is to detect the portion of the laser beam reflected from upper data layers selectively. The readout signal from the detector 48-1~2 is transmitted to a routing circuit 49 to selectively sent to a decoding circuit of a data processor.

Figure 3A:
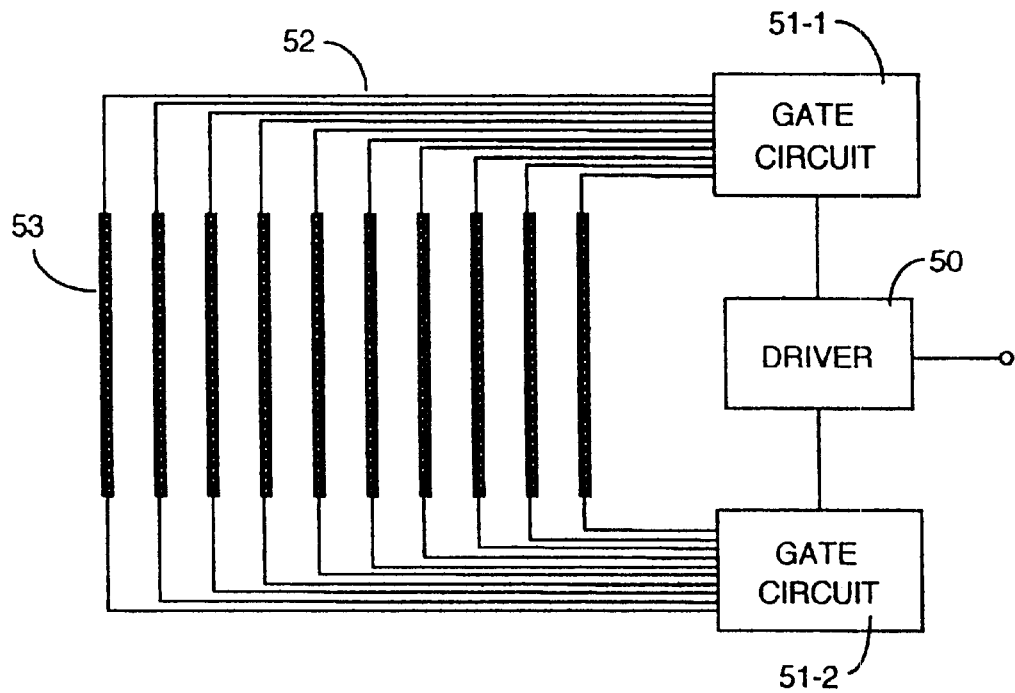
FIG. 3(a) shows a first pattern of an example of a liquid crystal diffraction device to which the present invention can be applied.

FIG. 3(a) shows a first pattern of an example of a liquid crystal diffraction device to which the present invention can be applied. And the example of a liquid crystal diffraction device described in FIG. 3(a) is suitable for the first exemplified structure of a pick-up described in the FIG. 2(a). According to an operation signal from a central processing unit, a driver circuit 50 modulates each of a gate circuit 51-1~2. Electrodes 52 are fabricated to connect to one of the liquid crystal segment 53. The array of the liquid crystal segments 53 forms a grating, and by selectively turning on and off the group of liquid crystal segments at equal intervals, the numerical aperture between the liquid crystal segments is modulated to change the diffraction angle of the laser beam. For example, by turning on the group of the liquid crystal segment with wide intervals, the diffraction angle is small. And, by turning on all of the liquid crystal segments at equal narrow intervals, the diffraction angle is large.

Figure 3B:
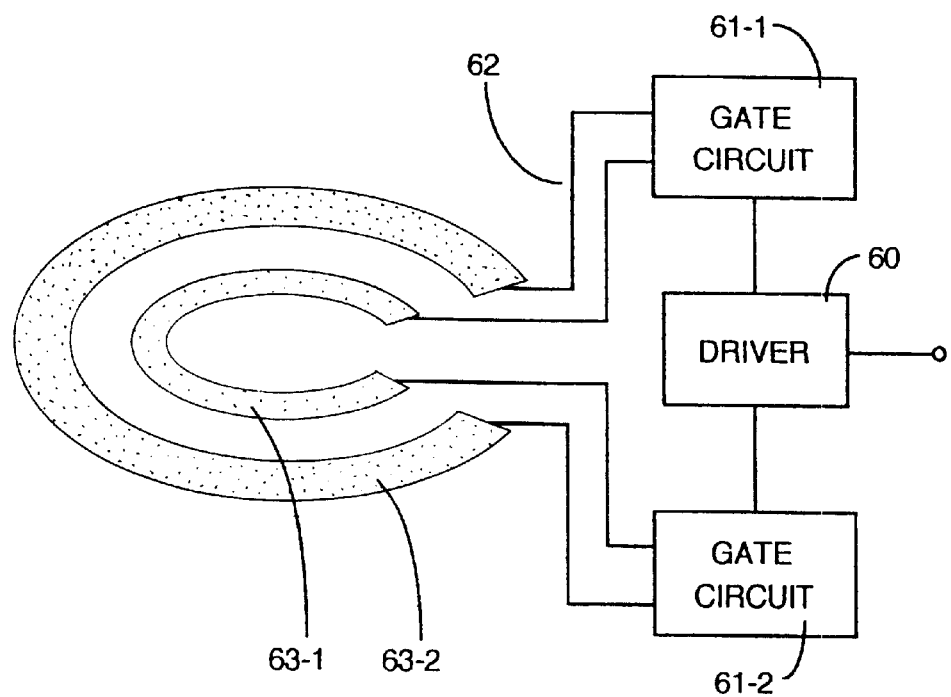
FIG. 3(b) shows a second pattern of an example of a liquid crystal diffraction device to which the present invention can be applied.

FIG. 3(b) shows a second pattern of an example of a liquid crystal diffraction device to which the present invention can be applied. And the example of a liquid crystal diffraction device described in FIG. 3(b) is suitable for the second exemplified structure of a pick-up described in the FIG. 2(b). According to an operation signal from a central processing unit, a driver circuit 60 modulates each of gate circuits 61-1~2. Each of the electrodes 62 is fabricated to connect to one of the liquid crystal segment 6-31~2. When the outer liquid crystal segment 63-2 is turned on to shut the outer spectrum of the laser beam, the laser beam is focused at far position because the numerical aperture is small. By turning on or off the liquid crystal segments selectively and changing the numerical aperture, the position of the focal point is moved.

Figure 4:
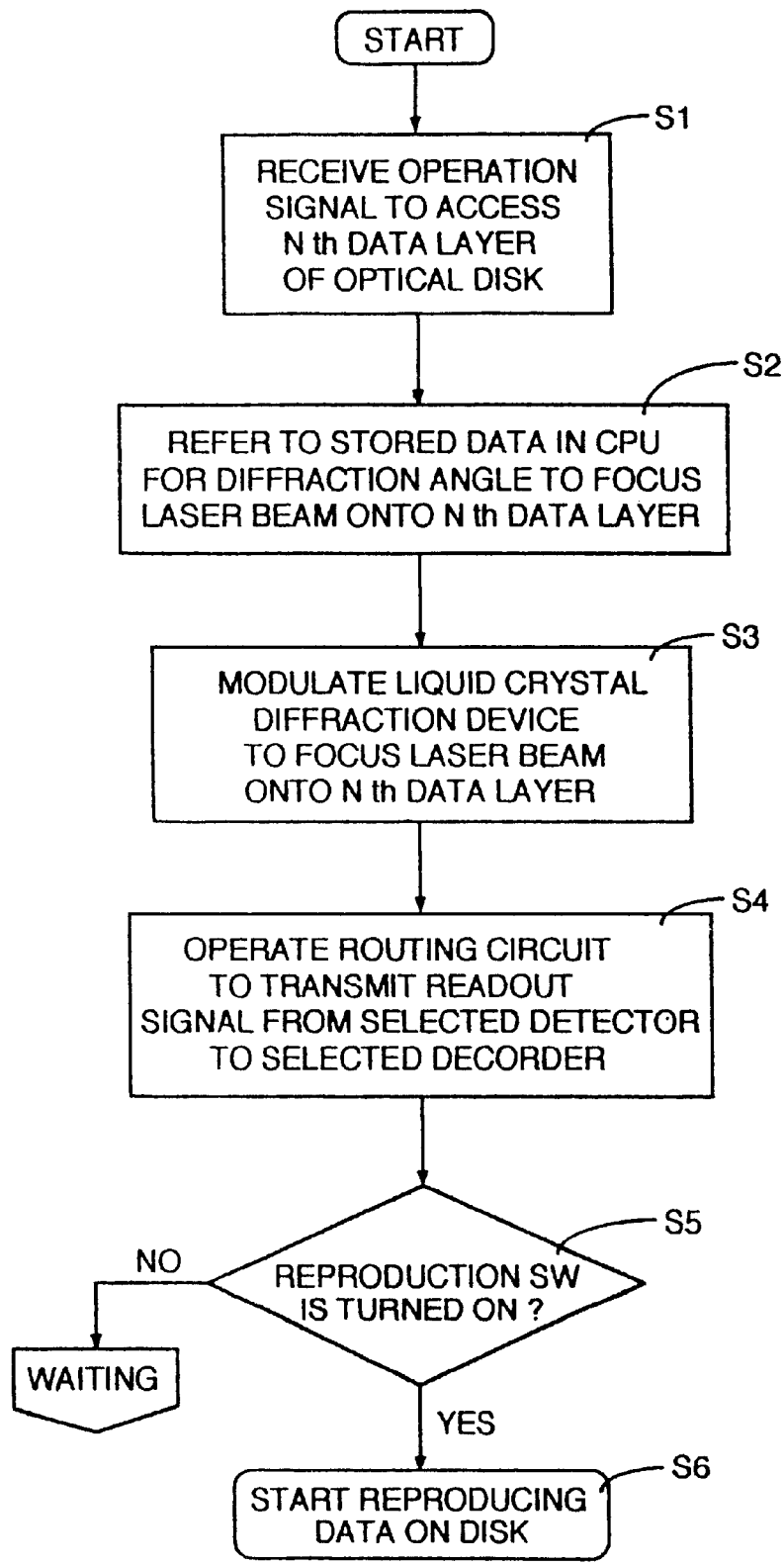
FIG. 4 is a flowchart for a description of an optical disk reading method of the present invention.

FIG. 4 shows a flowchart of an operation processing procedure in the central processing unit (CPU) to which an optical disk reading method of the present invention is applied. The CPU receives an operator's signal to access the Nth data layer of a multi-layered optical disk (Step 1: S1), wherein N is an integer greater than 1, and not greater than the total number of data layers M. Then the CPU refers to stored data in the CPU's memory for a diffraction angle to focus the laser beam onto the Nth data layer (S2). The CPU retrieves an operational coded signal, and transmits the signal to a liquid crystal diffraction device to modulate the liquid crystal diffraction device to deflect and focus the laser beam onto the Nth data layer (S3). After the liquid crystal diffraction device is modulated by the operational signal from the CPU, the CPU also operates a routing circuit to transmit a read-out signal from a detector which receives the laser beam reflected from the Nth data layer, to a selected decoding circuit in a data processor (S4). The routing circuit can connect and disconnect the read-out signal transmission path from the detector to the decoding circuit. At last, when a reproduction switch of a key operating unit is turned on by the operator (S5), the data reproduction is started (S6).

Although the invention has been particularly shown and described, it is contemplated that various changes and modification may be made without departing from the scope of the invention as set forth in the following claims.

What is claimed is:

1. A method of reading a multi-layered optical disk, comprising identifying a characteristic of the disk;
 selecting one of the layers of the disks; and
 accessing data on the disk, including
  focusing a laser beam onto the selected layer based on the identified characteristic, by modulating a liquid crystal diffraction device,
  reflecting the focused laser beam from the selected layer, and
  detecting the reflected laser beam.

2. A method according to claim 1, wherein said identifying includes determining the number of layers of the disk.

3. A method according to claim 1, wherein said identifying includes determining the thickness of the disk.

4. The method of claim 1, wherein said identifying includes reading a read-in region of the disk in which a total content of the disk is encoded.

5. The method of claim 1, wherein said modulating includes modulating at least one of a plurality of liquid crystal segments of the diffracting device to vary a focal point of the modulating device.

6. The method of claim 5, wherein said modulating includes modulating the liquid crystal segments to form a plurality of grating arrangements having different intervals.

7. The method of claim 5, wherein said modulating includes modulating the liquid crystal segments to block a portion of the spectrum of the laser beam.

* * * * *